(12) United States Patent
Fujioka

(10) Patent No.: US 9,015,796 B1
(45) Date of Patent: Apr. 21, 2015

(54) SYSTEMS AND METHODS FOR DEVICE CONFIGURATION AND ACTIVATION WITH AUTOMATED PRIVACY LAW COMPLIANCE

(71) Applicant: Robb Fujioka, Manhattan Beach, CA (US)

(72) Inventor: Robb Fujioka, Manhattan Beach, CA (US)

(73) Assignee: Fuhu Holdings, Inc., El Segundo, CA (US)

( * ) Notice: Subject to any disclaimer, the term of this patent is extended or adjusted under 35 U.S.C. 154(b) by 0 days.

(21) Appl. No.: 14/046,893

(22) Filed: Oct. 4, 2013

(51) Int. Cl.
| | |
|---|---|
| *G06F 17/00* | (2006.01) |
| *G06F 7/04* | (2006.01) |
| *G06F 21/62* | (2013.01) |
| *H04W 12/02* | (2009.01) |
| *H04L 29/06* | (2006.01) |
| *H04L 29/08* | (2006.01) |

(52) U.S. Cl.
CPC ........ *G06F 21/6245* (2013.01); *G06F 21/6254* (2013.01); *H04W 12/02* (2013.01); *H04L 63/0421* (2013.01); *H04L 67/22* (2013.01)

(58) Field of Classification Search
CPC . H04L 63/0421; H04L 67/22; G06F 21/6245; G06F 21/6254; H04W 12/02
USPC ....................................................... 726/1, 26
See application file for complete search history.

(56) References Cited

U.S. PATENT DOCUMENTS

| | | |
|---|---|---|
| 2004/0010472 A1 | 1/2004 | Hilby et al. |
| 2008/0005778 A1* | 1/2008 | Chen et al. ........................ 726/1 |
| 2009/0007259 A1 | 1/2009 | Argott |
| 2009/0111452 A1 | 4/2009 | Ying et al. |
| 2009/0138276 A1 | 5/2009 | Hayashida et al. |
| 2009/0247836 A1 | 10/2009 | Cole et al. |
| 2010/0269156 A1 | 10/2010 | Hohlfeld et al. |
| 2013/0035946 A1 | 2/2013 | Ratan et al. |
| 2013/0254660 A1 | 9/2013 | Fujioka |
| 2013/0326578 A1* | 12/2013 | Blom et al. ........................ 726/1 |

OTHER PUBLICATIONS

International Search Report issued on Jan. 13, 2015 in corresponding Application No. PCT/US2014/059115, filed Oct. 3, 2014, inventor Robb Fujioka.

* cited by examiner

*Primary Examiner* — Techane Gergiso
(74) *Attorney, Agent, or Firm* — Steptoe & Johnson LLP

(57) ABSTRACT

A dual-path out-of-box experience for automating a quick, simple and restricted configuration, or a full configuration, of a device. The simple configuration allows a user to operate the device to access restricted applications and device resources. The full configuration includes performing, by an international privacy law analysis module, processes for determining applicable privacy law based on a user's location information, and for showing compliance with applicable privacy law. Processes include obtaining a user's consent to the terms of a privacy policy, and verifying a user's authority to consent to the terms of the privacy policy.

10 Claims, 5 Drawing Sheets

SYSTEMS AND METHODS FOR DEVICE CONFIGURATION AND ACTIVATION WITH AUTOMATED PRIVACY LAW COMPLIANCE

TECHNICAL FIELD

The inventions relate generally to the field of device configuration and, more particularly, but not by way of limitation, to initial device configuration and activation with automated privacy policy localization and acceptance confirmation.

BACKGROUND

The experience that a user has when preparing a first use of a new product is the user's out-of-box experience (OOBE). Traditionally, computer equipment and systems were difficult to configure for first use. Technical operations were often required, including correct input of data parameter values into particular forms, or to provide selections for technical configuration options, in order to set up user accounts and profiles, system passwords, networking, user preferences and privacy controls. Further, the input interfaces available for configuration often reside within device control panels or other settings interfaces that are intimidating to users who do not have prior technical knowledge. A user manual or a README file were typically tools provided to guide a user to prepare the product or device for first use.

Approaches for improving OOBE for computing devices or equipment include using guided setups that are launched when a new device is powered-up by a user for the first time. Guided setups include using setup assistants or wizards that provide a user with an ordered path to input the required information and perform the required selections. Using such setup assistants or wizards, the device linearly navigates the user through a series of interfaces which prompt the user for the required information, and may provide instructions for selecting available configuration options. It is desirable to provide an OOBE that further improves on the basic setup for a device.

BRIEF SUMMARY

A dual path OOBE is provided for configuring a computing device. A first simple setup path is provided for bypassing certain setup steps to initialize a limited and restricted configuration on a device. The simple setup path allows a user access to certain open apps and games that are pre-loaded on the device. The full setup path allows a user to access all privacy-law compliant device features, where privacy-law compliance may include disclosure to the user of types personal information collected, used, or disclosed in the course of operating the device in combination with obtaining parental consent for the collection, use, or disclosure of the personal information for underaged users. The full setup path employs an international privacy law analysis module to achieve compliance with privacy requirements depending on the applicable law governing the collection of user and operational data from the device. Examples of privacy law includes the Children's Online Privacy Protection Act (COPPA), a United States federal law, and may include privacy laws enacted in other countries and jurisdictions.

Various embodiments may incorporate one or more of these and other features described herein while remaining within the spirit and scope of the invention. Further features of the system or method for initial device configuration and activation with privacy protection, its nature, and various advantages and embodiments will be more apparent by reference to the accompanying drawings and the following detailed description.

BRIEF DESCRIPTION OF THE DRAWINGS

Preferred embodiments of the present invention are illustrated by way of example, and not by way of limitation, in the figures of the accompanying drawings and in which like reference numerals refer to similar elements and in which.

DETAILED DESCRIPTION

In the following description, numerous specific details have been set forth to provide a more thorough understanding of some embodiments of the present invention. However, it will be appreciated by those skilled in the art that embodiments of the invention may be practiced without such specific details or with different implementations for such details. Additionally some well known structures have not been shown in detail to avoid unnecessarily obscuring the present invention.

Figure 1A:
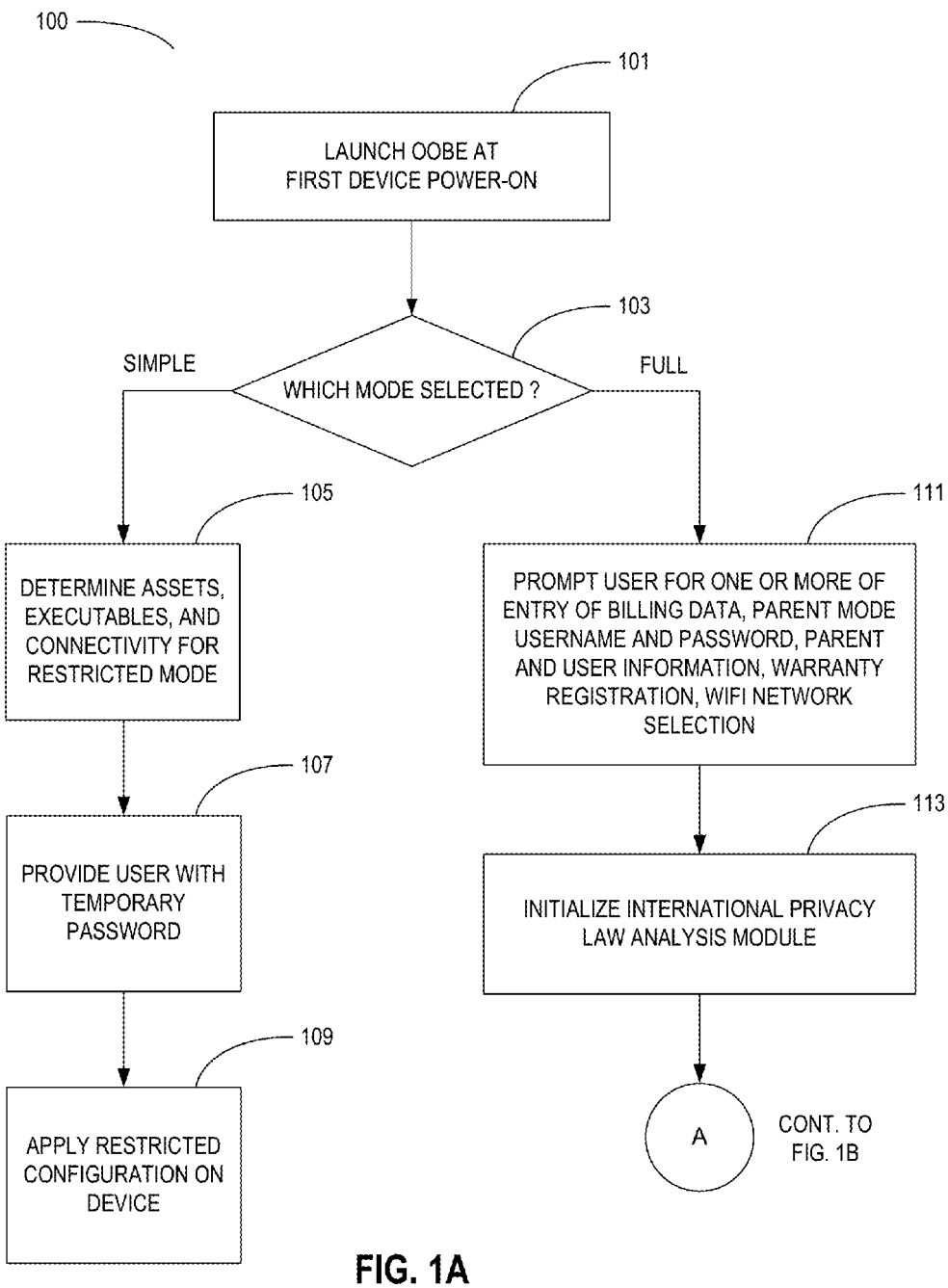
FIGS. 1A and 1B are a flow diagram illustrating a dual-path out-of-box experience, according to some embodiments.
Figure 1B:
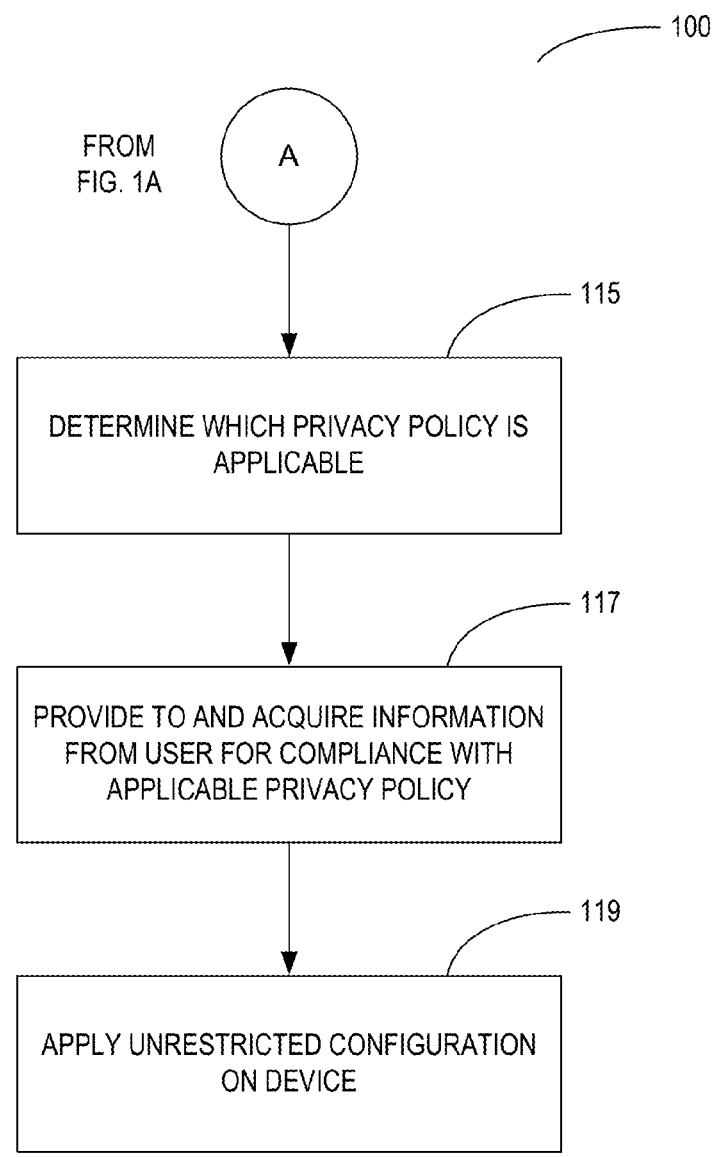

FIGS. 1A and 1B are a flow diagram in two parts illustrating a computer-device-executed process 100 for providing a dual-path out-of-box experience (OOBE), according to some embodiments. At step 101, a dual-path OOBE is launched at device initialization. In some embodiments, at step 101, device initialization occurs during the device's first power-on by a user after the device is newly configured from the factory. In some embodiments, device initialization occurs during the device's first power-on after the device is reset to factory settings. In some embodiments, the dual-path OOBE is manually launched after receiving a user's launch command. At step 103, a mode selected by a user is detected. Examples of OOBE paths include a simple path that provides restricted access to a pre-determined set of device applications and resources, or a full path that provides full access to all device resources.

In some embodiments, the dual-path is implemented by use of settings parameters, such that a simple path comprises a set of parameter values providing access to a limited set of device applications and resources, and a full path comprises a set of parameter values providing access to an unrestricted set of device applications and resources.

If a simple path is determined to have been selected at step 103, at step 105, device applications and resources are determined by the device for the simple path. Examples of device applications and resources that may be affected by the simple-path selection include media assets such as videos and music, application programs, internet connectivity permissions, and access to online purchasing of new content. According to some embodiments, the device may include multiple operating modes, such as parent-mode or child-mode, wherein an input of a valid password is required to switch from one mode to another. In such embodiments, at step 107, a temporary or default parent-mode password is provided to input authorization for switching between modes. A temporary password may include a hard-coded password or a factory-set password that is disclosed to a parent during set-up that is intended to be replaced by a user-provided password. At step 109, the simple path is completed and the device allows operation in a restricted mode.

Returning to step 103, if a full path is determined to have been selected, at step 111, one or more prompts are provided to request input from the user for setting up accounts and settings on the device, including, for example, one or more of billing data, parent mode username and password, user information, including parent information and child information for some embodiments, warranty registration, and internet connectivity selections, including WiFi network selection. The requests for information may occur in any particular order on various interface configurations.

At step 113, an international privacy law analysis module is invoked. Continuing to FIG. 1B, at step 115, based on user location information, the module determines which, if any, privacy policies are applicable under laws, regulations, and/or other requirements relevant to use of the device within one or more legal, corporate, or other jurisdictions encompassing the location of use as reflected in the user location information. In exemplary embodiments, the international privacy law analysis module determines the applicable privacy policy by accessing a database or other store of information correlating potential locations of use with corresponding privacy policies preferably conforming with laws, regulations, and/or other requirements applicable to use of the device in each potential location of use. User location information may be accepted from a user at step 111. Alternatively, user location information is automatically determined based on location detection methods. For example, the device may detect current device location by Global Positioning System (GPS) technology in the device and/or an associated IP address location or other location service on the device if internet or other required network connectivity is available during the OOBE process. In some embodiments, the use GPS technology may be restricted by privacy laws and is therefore not available for the OOBE process. In some embodiments, user location information is set based on the firmware property file on a device, which may be read by the system without user input. User location information may be obtained by the device by other methods without departing from the spirit of the invention.

Once the applicable privacy policy is determined, at step 117, the required privacy information is provided to the user, and required user input is requested and acquired from the user, for compliance with the particular applicable policy. Information provided to a user includes privacy notices and disclosures, and information requested and acquired includes obtaining a user's agreement with the terms of the privacy notice, in compliance with the applicable privacy law. Additionally, verification of the user's authority to agree with the privacy policy under applicable privacy law is also obtained if necessary. At step 119, upon compliance with the applicable privacy policy, the device is unlocked for unrestricted use. In some embodiments, the OOBE process allows for partial compliance, and the device is unlocked for a modified restricted use that allows access to applications and resources that are in accordance with partial compliance. Partial compliance is further described below with reference to FIG. 3.

While the steps in process 100 are presented in a particular order, it is understood that the acquisition and provision of the necessary information may occur in another order without departing from the spirit of the invention.

Figure 2:
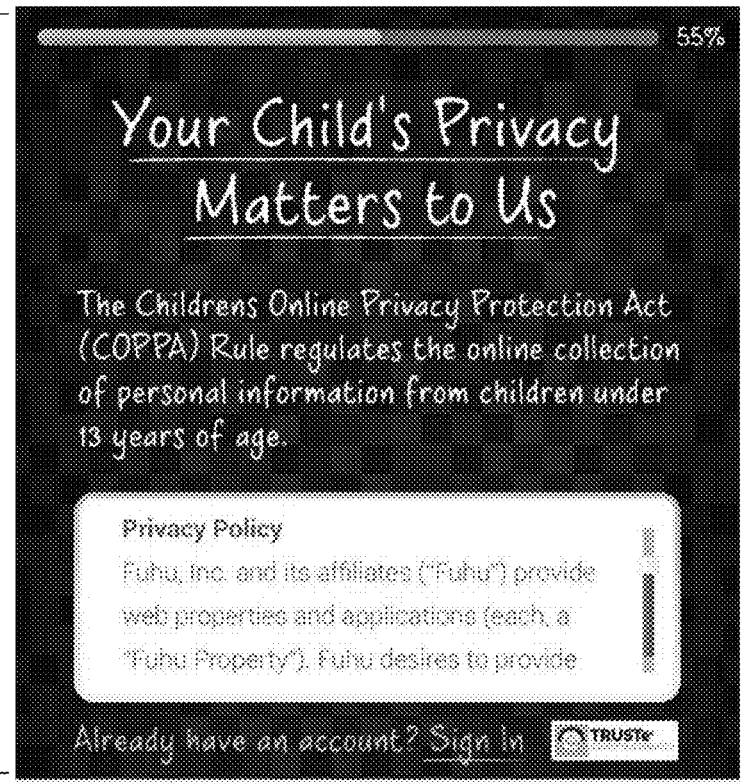
FIG. 2 is an example of an interface provided within the out-of-box experience for complying with COPPA, according to some embodiments.
Figure 2:
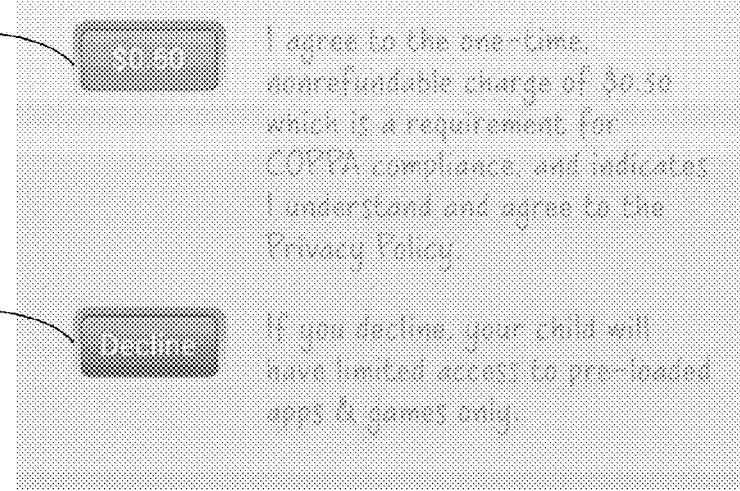

FIG. 2 illustrates an example of the interface presented during OOBE process 100, with reference to FIGS. 1A and 1B, for providing and obtaining information from a user in compliance with COPPA after COPPA is determined by the international privacy law analysis module to be the applicable privacy law for the device, according to some embodiments. Privacy disclosure 201 includes the information provided to a user with authority to consent to the privacy notice, such as a person of adult age. Button 203 is provided to record a user's consent to privacy disclosure 201, and button 205 is provided to record that a user has declined to agree with privacy disclosure 201.

Upon receiving input at button 203, the system begins a verification process for ensuring that the user has authority to consent under COPPA. For example, a user is requested to provide a valid credit card for charging with a temporary amount, such as $1, whereby access to a valid credit card is presumed to constitute reasonably reliable evidence that the user is an adult over required age. While the interface of FIG. 2 presents a system for using a credit card charge to verify authority to consent, other processes may be used in some embodiments to verify authority to consent without departing from the spirit of the invention.

Upon receiving input at button 205 indicating that the user declines to agree, the system follows a simple path OOBE for allowing operation of the device in restricted mode.

Figure 3:
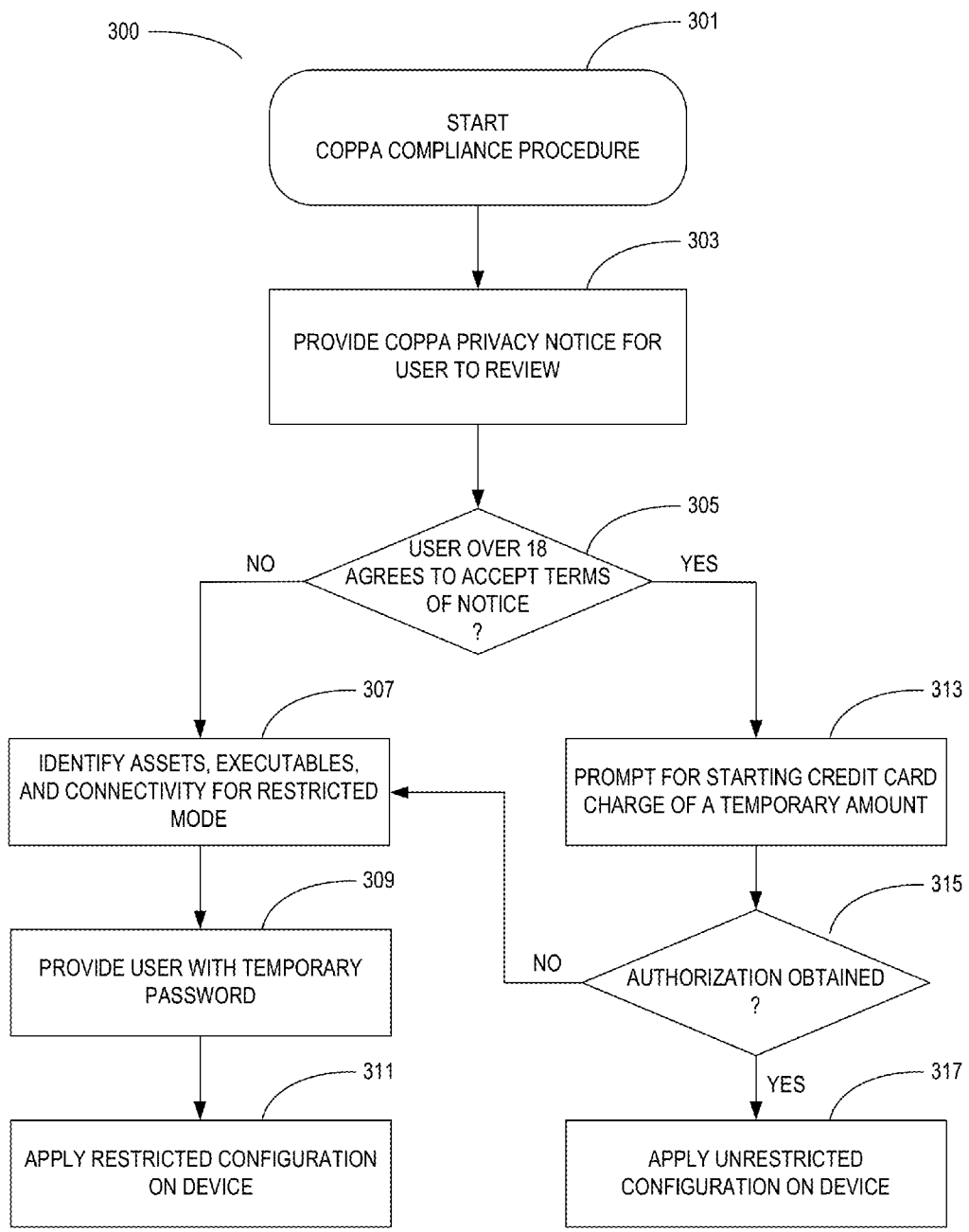
FIG. 3 is a flow diagram illustrating a method within the out-of-box experience for complying with COPPA, according to some embodiments.

FIG. 3 is a flow diagram illustrating process 300 for complying with United States COPPA requirements, according to some embodiments. At step 301, after COPPA is determined to be the applicable privacy policy for the device, a COPPA compliance procedure begins. At step 303, a COPPA privacy notice is provided for the user's review. At step 305, input is received that indicates whether a user agrees to accept the terms of the notice. If a user does not accept, at step 307, the device does not proceed to operation in full mode, and steps similar to the simple path with reference to FIG. 1A may proceed. For example, at step 307, device applications and resources are determined for the declined path. Examples of device applications and resources that may be affected by the declined-path selection include media assets such as videos and music, application programs, internet connectivity permissions, and access to online purchasing of new content. According to some embodiments, the device may include multiple operating modes, such as parent-mode or child-mode, where an input of a password is required to switch from one mode to another. In such embodiments, at step 309, a temporary or default parent-mode password is provided to input authorization for switching between modes. At step 311, the declined OOBE path is completed and the device allows operation in a restricted configuration.

Alternatively, if at step 305, the user agrees to accept terms, the authority to accept the terms is verified in proceeding steps. For example, according to some embodiments, at step 313, a user is prompted to start a credit card charge for a temporary amount, such as $1. At step 315, if authorization for the credit card fails, the process proceeds with the declined path at steps 307, 309, and 311, to allow operation of the device in restricted mode. If authorization is obtained, at step 317, the device is unlocked for unrestricted full use. The credit card authorization failure may be due to an error in the entry of the credit card information by a consenting parent. Accordingly, at step 315, if authorization for a credit card fails, the process proceeds to step 303 to restart the COPPA term acceptance process instead of defaulting to a simple path configuration, thereby allowing a user to correctly execute the COPPA compliance procedure before configuring the device to any mode of use.

In some embodiments, the verification of parental status is performed separately from obtaining acceptance by a parent of the terms of the notice, and a parent may accept some terms of the notice, but not others, in partial compliance COPPA. Under COPPA, collection, use, and disclosure of personal information of a child requires notice to and consent of the child's parent if the child is under age 13. Personal information includes, for example, full name of the child, use of a persistent identifier to track a child's usage, and geolocation data, among other data. In some embodiments, at step 305, a parent accepts and consents to the collection of certain personal information, and the process proceeds with steps 313 to verify the parental consent. At step 317, the device unlocks the applications and content that corresponds to the scope of the parent's consent for a modified-restricted configuration. In other words, the device applies a configuration that corresponds to the extent to which the privacy policy requirements applicable to COPPA are met by the type of consent acquired via the privacy module interface.

Figure 4:
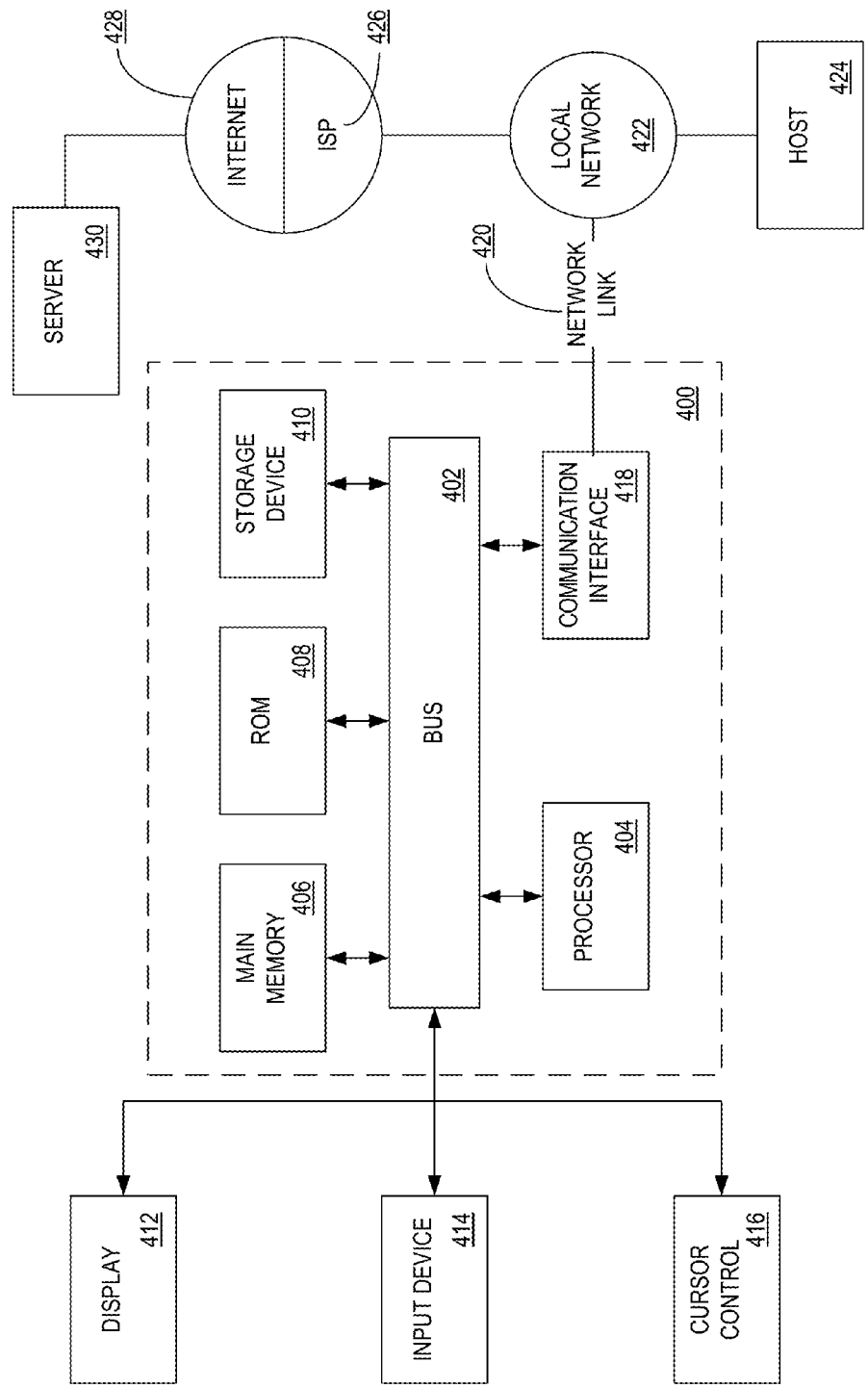
FIG. 4 is a block diagram that illustrates a computer system upon which some embodiments may be implemented.

FIG. 4 is a block diagram that illustrates an example of a computer system 400 upon which some embodiments may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, optical disk, or a flash memory device, is provided and coupled to bus 402 for storing information and instructions.

Computer system 400 may be coupled via bus 402 to a display 412, such as a cathode ray tube (CRT) or liquid crystal display (LCD) or other display device, for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. In some embodiments, input device 414 is integrated into display 412, such as a touchscreen display for communication command selection to processor 404. Another type of input device includes a video camera, a depth camera, or a 4D camera. Another type of input device includes a voice command input device, such as a microphone operatively coupled to speech interpretation module for communication command selection to processor 404.

Some embodiments are related to the use of computer system 400 for implementing the techniques described herein. According to some embodiments, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hardwired circuitry may be used in place of or in combination with software instructions to implement the invention. Thus, embodiments are not limited to any specific combination of hardware circuitry and software. In further embodiments, multiple computer systems 400 are operatively coupled to implement the embodiments in a distributed system.

The terms "machine-readable medium" as used herein refer to any medium that participates in providing data that causes a machine to operate in a specific fashion. In an embodiment implemented using computer system 400, various machine-readable media are involved, for example, in providing instructions to processor 404 for execution. Such a medium may take many forms, including but not limited to storage media and transmission media. Storage media includes both non-volatile media and volatile media. Non-volatile media includes, for example, optical disks, magnetic disks, or flash memory devices, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, flash memory device, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a data transmission line using a modem. A modem local to computer system 400 can receive the data on the data transmission line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or other internet connection device, or a modem to provide a data communication connection to a corresponding type of data transmission line. As another example, communication interface 418 may be a local area network (LAN) card to provide a data communication connection to a compatible LAN. Wireless network links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the Internet 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send and receive messages and data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Various additions, deletions and modifications are contemplated as being within its scope. The scope of the invention is, therefore, indicated by the appended claims rather than the foregoing description. Further, all changes which may fall within the meaning and range of equivalency of the claims and elements and features thereof are to be embraced within their scope.

What is claimed is:

1. A device configured to provide automated device configuration and privacy law compliance, comprising:
one or more processors of the device executing instructions read from a computer-readable storage medium, the instructions, which when executed at device initialization, causing the device to perform a method comprising:
determining a configuration path selected from a simple path and a full path;
if the simple path is determined, identifying device applications and resources for a restricted configuration, and applying the restricted device configuration to allow access to the identified device applications and resources;
if the full path is determined, initializing a privacy policy analysis module, which executes a method comprising:
determining a location information of the device;
determining based on the location information one or more privacy policy requirements applicable to use of the device at the location information;
providing one or more privacy policy disclosures at a privacy module interface based on the one or more privacy policy requirements applicable to the location information;
acquiring via the privacy module interface an information needed to comply with the privacy policy requirements applicable to the location information;
confirming whether the information acquired via the privacy module interface meets the privacy policy requirements applicable to the location information; and
applying a configuration on the device that corresponds to an extent to which the privacy policy requirements applicable to the location information are met by the information acquired via the privacy module interface.

2. The device of claim 1, wherein determining a configuration path comprises defaulting to the simple path in the absence of a valid authorization for the full path.

3. The device of claim 1, wherein applying a configuration on the device further comprises verifying whether one or more inputs accepted via a user interface comprise a valid authorization for the configuration.

4. The device of claim 3, wherein the valid authorization comprises an input of a credit card number determined to correspond to a valid credit card account to record a monetary transaction on the account.

5. The device of claim 1, further comprising a global positioning system (GPS) receiver, wherein, if a full path is determined, the step of determining a location information of the device comprises a determination by the GPS receiver of a physical location of the device.

6. The device of claim 1, if a full path is determined, the device provides an interface for accepting input of the location information.

7. The device of claim 1, wherein if the location information indicates a location in the United States, then the step of determining based on the location information one or more privacy policy requirements applicable to use of the device comprises determining that one or more provisions of the United States' Children's Online Privacy Protection Act (COPPA) apply to use of the device.

8. The device of claim 7, wherein the step of providing one or more privacy policy disclosures at a privacy module interface comprises providing COPPA-compliant privacy policy disclosures.

9. The device of claim 8, wherein the step of acquiring via the privacy module interface an information needed to comply with the privacy policy requirements comprises acquiring a COPPA-compliant consent to one or more of collection, use, or disclosure of personal information regarding minor users of the device.

10. The device of claim 1, wherein in response to determining that the information acquired via the privacy module interface does not meet the privacy policy requirements applicable to the location information, determining the configuration path to be the simple path.

* * * * *